US010739618B2

United States Patent
Chen et al.

(10) Patent No.: US 10,739,618 B2
(45) Date of Patent: Aug. 11, 2020

(54) WEARABLE SYSTEMS AND METHODS FOR TREATMENT OF A NEUROCOGNITIVE CONDITION

(71) Applicant: Kessler Foundation Inc., East Hanover, NJ (US)

(72) Inventors: Peii Chen, New York, NY (US); Anna M. Barrett, South Orange, NJ (US); Geoffrey Hill, New City, NY (US)

(73) Assignee: Kessler Foundation Inc., Esat Hanover, NJ (US)

( * ) Notice: Subject to any disclaimer, the term of this patent is extended or adjusted under 35 U.S.C. 154(b) by 0 days.

(21) Appl. No.: 15/861,256

(22) Filed: Jan. 3, 2018

(65) Prior Publication Data
US 2018/0143456 A1  May 24, 2018

Related U.S. Application Data

(63) Continuation of application No. 14/278,776, filed on May 15, 2014, now abandoned.

(51) Int. Cl.
   *G02C 7/14* (2006.01)
   *H04N 5/262* (2006.01)
   *G02B 5/00* (2006.01)

(52) U.S. Cl.
   CPC ............... *G02C 7/14* (2013.01); *G02B 5/003* (2013.01); *H04N 5/2621* (2013.01)

(58) Field of Classification Search
   CPC .................. H04N 5/2621; G02C 7/14
   See application file for complete search history.

(56) References Cited

U.S. PATENT DOCUMENTS

| | | | | |
|---|---|---|---|---|
| 1,516,590 A | * | 11/1924 | Dorsey | A45D 44/08 2/50 |
| 2,199,334 A | * | 4/1940 | Ferry | A45D 44/08 2/50 |
| 3,597,763 A | * | 8/1971 | Bienvenu | A41B 13/103 2/49.3 |
| 4,715,293 A | * | 12/1987 | Cobbs | A47B 23/002 108/43 |
| 5,649,654 A | * | 7/1997 | Hayward, Jr. | A45F 5/00 108/43 |
| 6,307,526 B1 | * | 10/2001 | Mann | G02B 27/017 345/7 |

(Continued)

OTHER PUBLICATIONS

Redding et al., Prism adaptation in left-handers, Atten Percept Psychophys (2011) 73:1871-1885, May 17, 2011, Psychonomic Society, Inc. 2011 (Year: 2011).*

(Continued)

*Primary Examiner* — Christopher S Kelley
*Assistant Examiner* — Boubacar Abdou Tchoussou

(57) ABSTRACT

Wearable systems and associated methods for treatment of a neurocognitive impairment, disease or disorder in patients including a wearable visual field occluder; an attachment system configured for releasably attaching the wearable visual field occluder to th patient during treatment such that, when attached to the patient, the visual field occluder blocks visual feedback of an arm movement of the patient; and an eyewear having at least one lens comprising a prism, wherein the eyewear is configured to be worn by the patient separate and unsupported by the wearable visual field occluder.

10 Claims, 5 Drawing Sheets

(56) References Cited

U.S. PATENT DOCUMENTS

| | | | | |
|---|---|---|---|---|
| 8,157,137 B1* | 4/2012 | Laird | ............ | A45F 3/14 |
| | | | | 108/43 |
| 8,267,294 B2* | 9/2012 | Yu | ............ | A45F 3/10 |
| | | | | 224/623 |
| 8,696,116 B2* | 4/2014 | Gottlieb | ............ | G02C 7/14 |
| | | | | 351/159.58 |
| 2002/0085843 A1* | 7/2002 | Mann | ............ | E03C 1/057 |
| | | | | 396/374 |
| 2009/0237611 A1* | 9/2009 | Walsh | ............ | G02C 7/14 |
| | | | | 351/158 |
| 2010/0016730 A1* | 1/2010 | Tanaka | ............ | A61B 3/024 |
| | | | | 600/476 |
| 2012/0062838 A1* | 3/2012 | Gottlieb | ............ | G02C 7/14 |
| | | | | 351/159.77 |
| 2013/0093788 A1* | 4/2013 | Liu | ............ | G06F 3/011 |
| | | | | 345/633 |
| 2016/0334644 A1* | 11/2016 | Garofolo | ............ | G02C 7/14 |

OTHER PUBLICATIONS

Rossetti et al. "Prism Adaptation to a Rightward Optical Deviation Rehabilitates Left Hemispatial Neglect," Nature, 395(6698), 166-169 (1998) (Year: 1998).*

* cited by examiner

WEARABLE SYSTEMS AND METHODS FOR TREATMENT OF A NEUROCOGNITIVE CONDITION

This application is a continuation application of U.S. patent application Ser. No. 14/278,776, entitled "Wearable Systems and Methods for Treatment of a Neurocognitive Condition," filed May 15, 2014, which is hereby incorporated by reference in its entirety herein.

FIELD OF THE INVENTION

The instant invention generally relates to a wearable system for treatment of a neurocognitive impairment, disease or disorder in a patient, and specifically to such a system employing a visual field occluder.

All documents cited to or relied upon below are expressly incorporated herein by reference.

BACKGROUND OF THE INVENTION

Since Yves Rossetti and colleague's seminal report (Rossetti, et al., "Prism Adaptation to a Rightward Optical Deviation Rehabilitates Left Hemispatial Neglect," Nature, 395(6698), 166-169 (1998)), many researchers and clinicians have studied prism adaptation for treating the neurocognitive disorder of spatial neglect (also known as hemispatial neglect, unilateral spatial neglect, visual inattention, visuospatial inattention, visuospatial neglect or visual neglect). Spatial neglect is a neurocognitive disorder affecting attentional control, spatial perception and representation, and motor action planning. Spatial neglect commonly occurs after a stroke or brain injury. Individuals with spatial neglect demonstrate a failure or slowness to respond, orient or initiate towards contra-lesional stimuli. Right-brain-damaged individuals often neglect the left side, and the left-brain-damaged neglect the right side. Individuals with diffuse brain injuries usually demonstrate left-sided spatial neglect. Individuals with spatial neglect unfortunately have poor outcomes after standard and usual rehabilitative care. Prism adaptation treatment, by contrast, provides for a promising therapy protocol effectively addressing spatial neglect post stroke or brain injury and helps patients recover to functional independence.

Prism adaptation treatment (PAT) is a visuomotor procedure involving target-oriented arm movement guided by prism-shifted vision. During a treatment session, the patient wears prism goggles while performing tasks such as reaching to targets. The treatment effect is observed after the prisms are removed when the patient re-adapts to the normal visual world. At this time, the prism aftereffect is apparent; the patient's arm movement becomes more toward the left side if he/she adapted to the right-shifting prisms. In individuals with spatial neglect, the prism aftereffect is significant, lasting longer than healthy individuals and transferred to everyday activities. Thus, PAT shows promising therapeutic effects, reducing spatial neglect's adverse impact on functional behavior.

To enhance prism adaptation and, thus, the prism aftereffect as well as therapeutic effects, it is typical in the art to use an occluder to block the visual feedback of a certain portion of a patient's arm movements during a treatment session. The occlusion can achieve the so-called concurrent or terminal exposure. The concurrent version is to occlude the initial part of arm movement, allowing the patients to see their forearm, hand, finger and the target. The terminal version is to occlude the entire arm, allowing only the final hand/finger position and the target visible.

To achieve either version of occlusion, the art uses a "prism adaptation box," almost always fixed on a desk or workstation. Such cumbersome "box" occluders have the disadvantages of, for example, being stationary, non-moveable during prism adaptation and non-flexible to different individuals' shoulder heights. Further, patients have to stay very close to the box and sometimes are required to use an uncomfortable chin rest.

There, thus, exists a need in the art for a portable and wearable visual field occluder to provide a patient undergoing PAT with freedom of arm movement in any direction to any location without being constrained by the conventional "box" occluders.

SUMMARY OF THE INVENTION

The present invention is directed to a wearable system for treatment of a neurocognitive impairment, disease or disorder in a patient in need thereof, comprising: a visual field occluder releasably worn by the patient during the treatment comprising an opaque screen and attachment system, the attachment system configured to releasably attach the visual field occluder onto the patient.

The invention is also directed to a method of treating a neurocognitive impairment, disease or disorder in a patient in need thereof, comprising the steps of: placing eyewear onto the patient, the eyewear comprising at least one lens having a prism mounted thereon; placing a visual field excluder onto the patient such that the visual field occluder is releasably worn by the patient to substantially block visual feedback of arm movement of the patient during the treatment; and performing a prism adaptation procedure with the patient.

The invention is farther directed to eyewear for treatment of a neurocognitive impairment in a patient in need thereof, comprising: a frame; at least one lens having a prism mounted thereon; and a visual field occluder attached to the frame comprising an opaque screen; the visual field occluder configured to substantially block visual feedback of arm movement of the patient when the eyewear is worn during the treatment.

The invention is additionally directed to a wearable system for treatment of a neurocognitive impairment, disease or disorder in a patient in need thereof, comprising: eyewear having at least one display screen configured to be visible by at least one eye of a patient and otherwise blocking a portion of the patient's view beyond the eyewear for the at least one eye; at least one camera disposed on the eyewear configured to capture video images in front of the eyewear; and a video processor electrically coupled to the at least one display screen and the at least one camera, the video processor configured to provide video images captured by the camera to the at least one display screen; the video images including a selectable prismatic effect and blocking of substantial portions of arm movement of the patient when worn by the patient.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical systems and arrangements. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

The present invention generally relates to a system, device and method for treating a neurocognitive impairment, disease or disorder in a patient in need of such treatment. The invention is useful, for example, in prism adaptation treatment for individuals suffering from spatial neglect.

Exemplary Embodiments of the Invention

A wearable system is provided for treatment of a neurocognitive impairment, disease or disorder in a patient in need thereof, comprising a visual field occluder releasably worn by the patient during the treatment. The visual field occluder is useful for blocking the view of the initial arm movement of the patient during, for example, a prism adaptation therapy session. The visual field occluder comprises an opaque screen which can be made of any material commonly used in the art. Such materials include, for example, commercially available paperboard, fiberboard, foam board, plastic, metal, wood, fiberglass or textile material or combinations thereof.

In another embodiment of the invention, the material for the screen can be transparent but made opaque by covering it with an opaque cover made of, for example, paper or cloth. Any combination of materials and methods can be used to make the screen as long as the patient's view of his or her arm movement is blocked during therapy.

Figure 1:
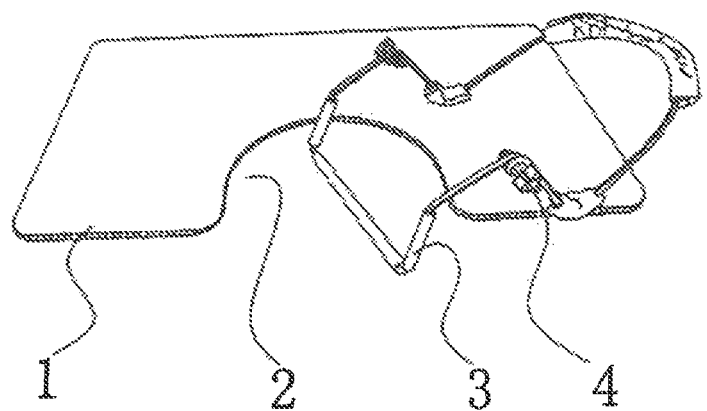
FIG. 1 is a perspective view of the opaque screen and attachment system used in an exemplary embodiment of the visual field occluder of the present invention.

FIG. 1 shows an example of a visual field occluder of the present invention. Opaque screen 1 made of, for example, plastic having recess 2 which comfortably accommodates the neck of the patient when the opaque screen is releasably attached onto the patient.

The visual field occluder also comprises an attachment system configured to releasably attach the visual field occluder onto the patient. The attachment system is comprised of one or more straps, wires or tubing or combinations thereof and can be made of any commercially available material such as, for example, nylon, polyester lanyard, plastic, leather, metal or textile material or combinations thereof. As shown in FIG. 1, attachment system 3 can be made of tubing, such as metal or plastic tubing, substantially strong enough to accommodate opaque screen 1 mounted thereon. The attachment system releasably attaches the visual field occluder onto the patient so as to make the system portable.

In another embodiment of the wearable system, and as also shown in FIG. 1, the visual field occluder further comprises adjusting mechanism 4 to adjust the opaque screen relative to the visual field of the patient. For example, the adjusting mechanism can adjust the opaque screen vertically, horizontally or angularly or combinations thereof relative to the visual field of the patient. Adjusting mechanism 4 can be part of attachment system 3 (as shown in FIG. 1) or attached to opaque screen 1 (not shown) or combinations thereof.

Figure 2:
FIG. 2 is a perspective view of an exemplary wearable system embodiment of FIG. 1 comprising a visual field occluder reversibly attached around the neck of a patient and prism goggles.

In one embodiment, the visual field occluder is releasably attached around the neck of the patient by metal tubing. As seen in FIG. 2, a patient is shown with opaque screen 1 reversibly attached to his neck via attachment system 5.

Figure 3:
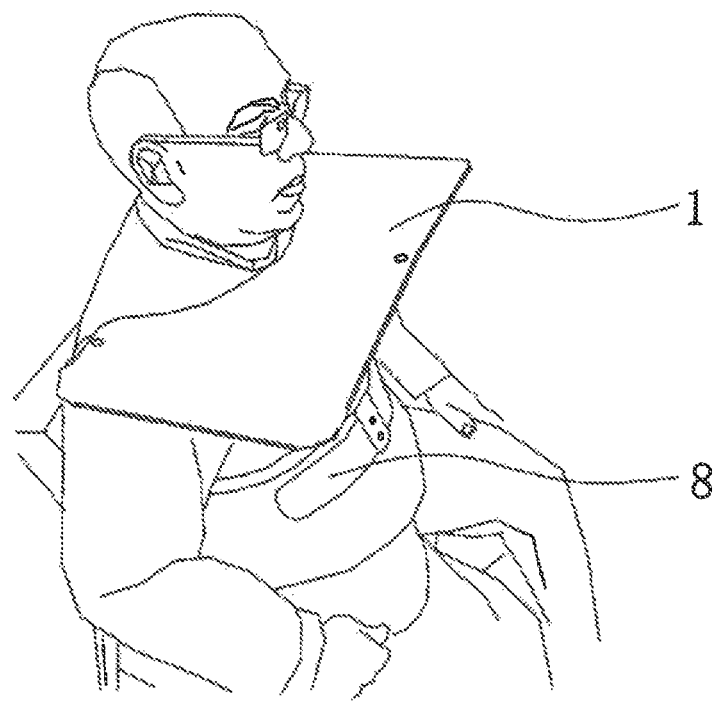
FIG. 3 is a perspective view of an alternative wearable system embodiment of the invention comprising a visual field occluder reversibly attached around the torso of a patient.

In another embodiment, the visual field occluder is releasably attached around the torso of the patient by straps. As seen in FIG. 3, a patient is shown with opaque screen 1 reversibly attached on his shoulders via torso strap 8.

Figure 5:
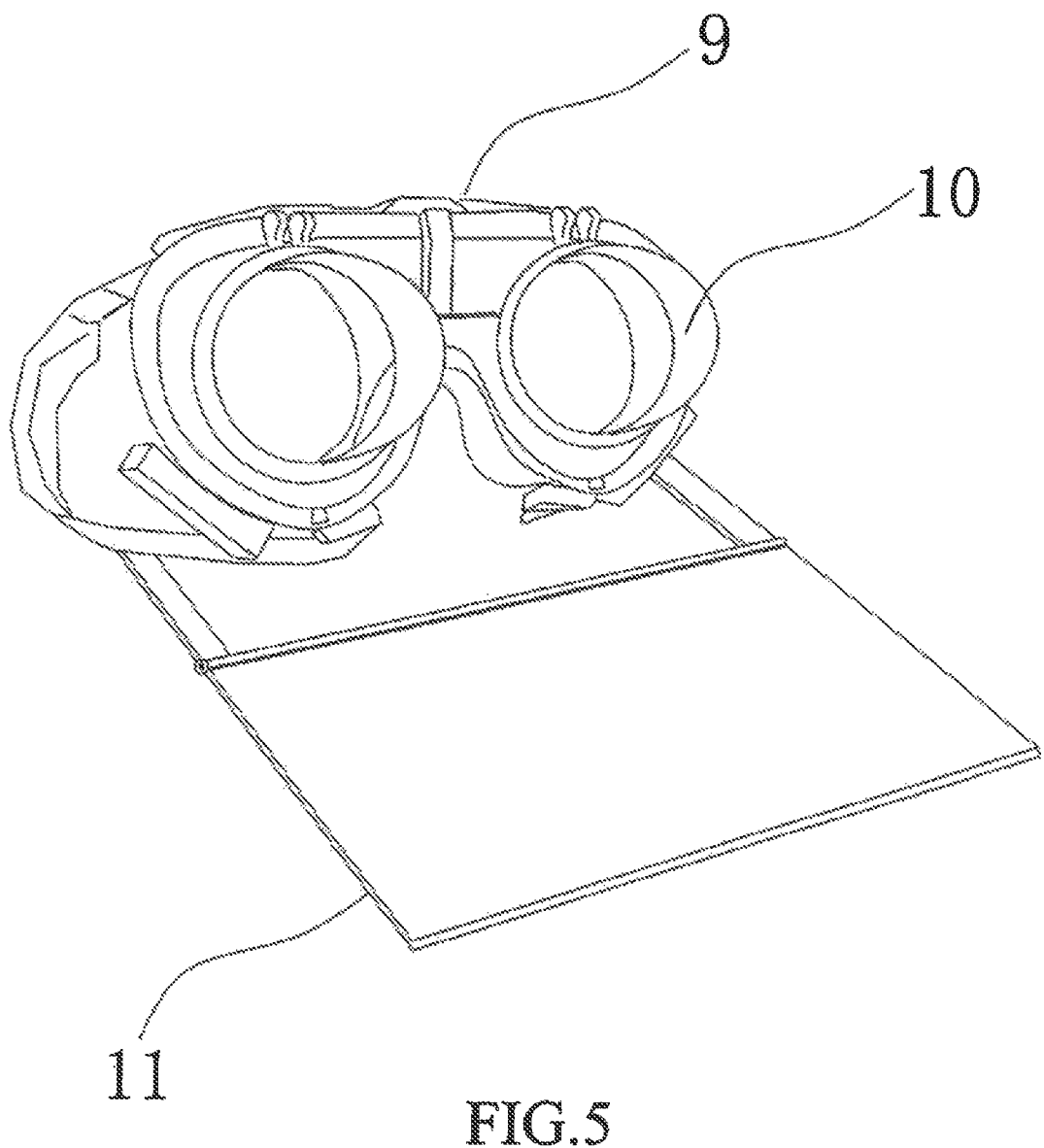
FIG. 5 is a perspective view of an exemplary eyewear embodiment of the present invention having a visual field occluder attached thereon.

The wearable system of the invention can further include eyewear having lenses and prisms thereon for the treatment of, for example, spatial neglect. Examples of prism lenses are those that are commonly used in the art and can be found, for example, in U.S. Pat. No. 4,779,972 and US Published Application No. 2012/0062838, the contents of both of which are expressly incorporated by reference herein. As seen in FIG. 2, goggles 6 comprise lenses with prisms 7 mounted thereon. The base of prism 7 is directed toward the visual field loss to bring the entire visual field toward ispilesional side of space. Prism 7 may be of any standard lens material, shape and power and may be fixed or rotatable on the lens. In patients with left-sided spatial neglect (after right-brain damage), a prism can be used with a thicker part on the left. For example, 20-diopter prism lenses shift the entire visual field 11.3 degrees to the right. For patients with right-sided neglect, in turn, lenses with the thicker part on the right can be used, In another embodiment of the invention, the visual field occluder can be a part of the eyewear worn by the patient. Examples of eyewear include, for example, glasses and goggles. In this embodiment, and as shown in FIG. 5, the eyewear includes frame 9, at least one lens having a prism 10 mounted thereon, and visual field occluder 11 attached to the frame comprising an opaque screen. Visual field occluder 11 is configured to substantially block visual feedback of arm movement of the patient when the eyewear is worn during the treatment.

Suitable materials for opaque screen 11 include, for example, a plastic, wood, fiberglass or textile material or combinations thereof. Further, visual field occluder 11 can include an adjusting system, the adjustment system configured to enable adjustment of the opaque screen vertically, horizontally or angularly relative to the visual field of the patient. Opaque screen 11 can be fixed or retractable for ease of storage.

Figure 7:
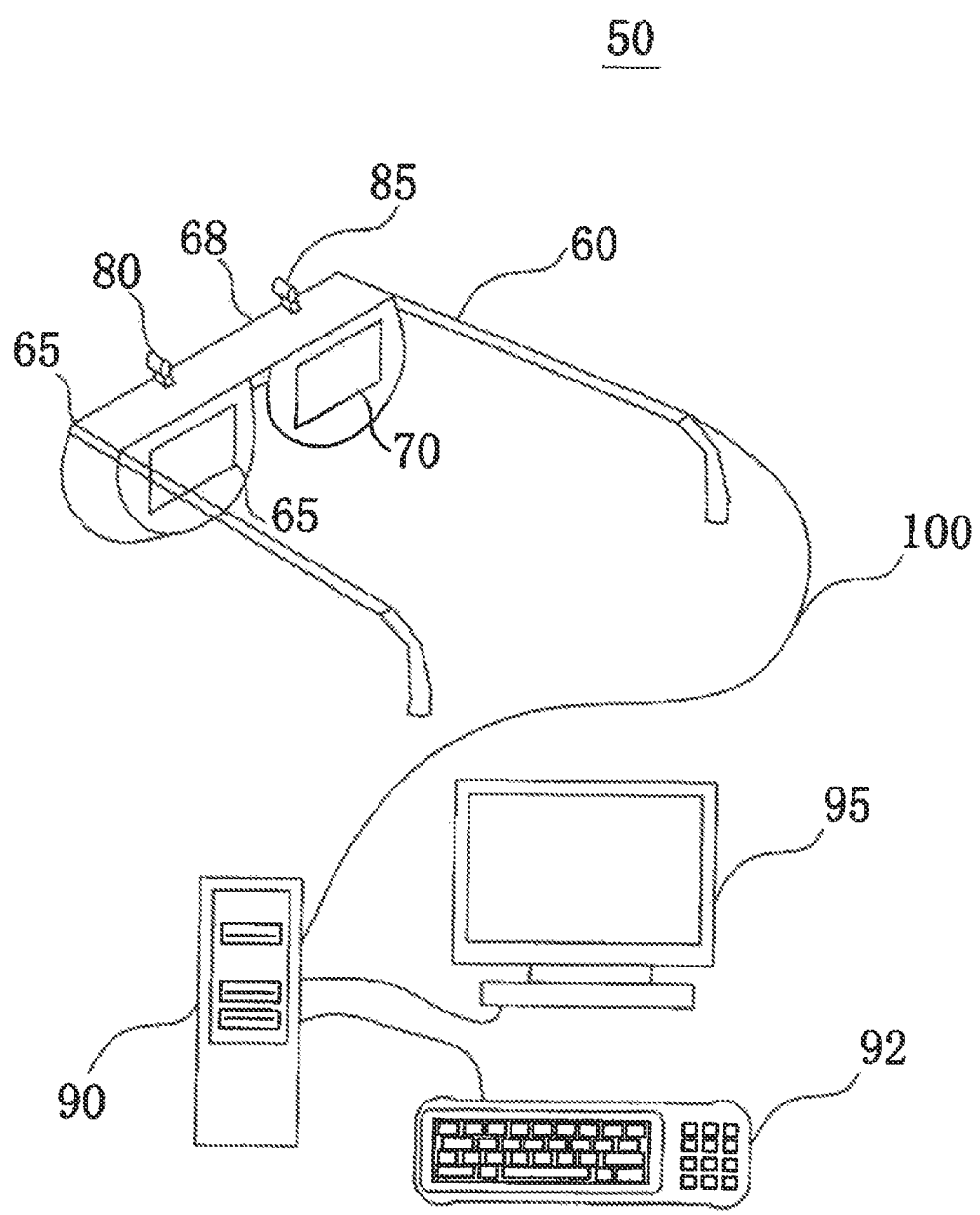
FIG. 7 depicts an exemplary alternative embodiment of the present invention employing digital video processing to perform the visual field occlusion.

FIG. 7 depicts a system 50 in accordance with alternative embodiment of the present invention that employs video processing for providing the required visual field occlusion and/or the prismatic effect. The system 50 comprises eyewear 60 coupled to a processor 90, such as a video processor, via communication line 100. The depicted eyewear 60 comprises a frame 65 such as, for example, an eye glass or goggle frame having mounted thereon left and right video display screens 70 and 75. In one embodiment, the eye glass or goggle frame is opaque and configured to block peripheral vision. The video display screens 70 and 75 are positioned so as to be in the vision field of the left and right eyes of a patient (not shown) wearing such eyewear 60. When eyewear 60 is worn by a patient, the display screens 70 and 75, alone or in combination with the frame 65, substantially block or blackout the patients view in front of or beyond the display screens 70 and 75.

Eyewear 60 further comprises left and right video cameras 80 and 85 mounted proximate the left and right video display screens 70 and 75. More specifically, the cameras 80 and 85 are positioned so that when eyewear 60 is worn by a patient, the cameras 80 and 85 capture at least a portion of the field of vision that a patient would have under normal circumstances when not wearing the eyewear 60. The cameras 80 and 85 are coupled to the video processor via the communication line 100 and, correspondingly, the video processor 90 is likewise coupled by the communication line 100 to the display screens 70 and 75.

The exemplary video processor 90 depicted in FIG. 7 is a general purpose computer connected to an input device 92 such as a keyboard and/or mouse, and a display 95. In operation, the video processor 90 is configured to receive signals received from the cameras 80 and 85, process such signals and provide a corresponding processed signal to the eyewear display screens 70 and 75. In addition, the video processor 90 is operable to display the processed signals on the display 95 alone or in a split screen configuration with the signals received from the cameras 80 and 85.

In operation, a patient wearing the eyewear 60 will view in the display screens 70 and 75 processed video images. These processed video images correspond to images captured by the cameras 80 and 85, respectively, processed by the video processor to emulate the required visual field occlusion in the screens 70 and 75, blacking out of substantial portions of the patients arm movements, as well as to image emulation of images passed through a prism, selectable by software operating in the video processor 90 or selectable by a clinician using the video processor input device 92. Numerous techniques are useable by the video processor 90 for providing the visual field occlusion including the video processing technique described in, for example, US Patent Application Publn. No. 2013/0093788, which is incorporated by reference herein.

Alternate methods for providing the visual field occlusion emulation may include a clinician using the input device 92 to set or adjust a defined block out region defined by a horizon line (either collectively or individually for the right and left eyes) on the display 95 for which the video processor 90 may black out the region located below the horizon line in the display 95 and corresponding displays 70 and 75. Further, the video processor 90 may utilize information from an angle sensor (not shown) disposed on the eyewear 60 for adjusting the height of such horizon line as the patient moves the position angle of their head while looking up or down.

The required prism effect of the processed signals supplied to the video screens 70 and 75 may be implemented by the video processor emulation or prisms disposed proximate lens of cameras 80 and 85. Specifically, the eyewear 60 may use selectively rotatable or substitutable prisms proximate the camera lenses to achieve the desired prism angle and direction in a substantially similar manner to the use of the prisms in the eyewear of the previously described embodiments of the invention with respect to FIGS. 2, 4 and 5. In one embodiment, the selectable prismatic effect is to select the magnitude and the direction of a visual-field shift.

The particular type of display screen used for the display screens 70 and 75 is not critical to practicing the present invention. Many different types of display screens are suitable for display screens 70 and 75 including, for example, light emitting diodes ("LED") including but not limited to organic LEDs ("OLEDs") and active-matrix, OLED, liquid crystal displays ("LCD") including but not limited to thin-film transistor ("TFT"), backlit and active-matrix LCDs display screens.

In addition, the video display screens 70 and 75 of the depicted eyewear 60 are intended to blackout the view of a patient wearing the eyewear 60. In the alternative, light transmissive panels may be used instead of the display screens 70 and 75. Such light transmissive panels such as, for example, twisted nematic (TN) LCD panels include at least one region that may be selectively blacked out. In such configurations, the patient wearing the eyewear 60 will be able to see through a first region of the light transmissive panels and not be able to see through a second region providing the desired visual field occlusion. Such LCD panels having a voltage applied across the liquid crystals in the second regions as controlled by the processor 90 automatically or under the control of a clinician using the input device 92. It should be understood that in such embodiments, the desired prismatic effect may be achievable by attaching prisms adjacent the TN LCD screens, for example, in a substantially similar manner to the use of the prisms in the eyewear of the previously described embodiments of the invention with respect to FIGS. 2, 4 and 5. In addition, it would be further advantageous for such eyewear to be goggles or to include an opaque insert between any gap between such eyewear and the patients cheeks or other facial structures to the view of the patient's arm(s).

It should be readily understood that the general purpose computer is depicted in FIG. 7 as the video processor 90 for ease of illustration and is not intended to be a limitation of the invention. Suitable alternative video processor configurations are useable with the present invention including, for example, application specific video processors wearable by a patient or incorporated into the eyewear 60. Moreover, for greater freedom of movement by a patient the communication line 100 may be flexible communication cable or fiber optic cable or may be a wireless link using, for example, the Bluetooth or Zigbee wireless communication standard, or an infra-red communications link.

Further, the exemplary embodiment depicted in FIG. 7 includes separate display screens 70 and 75. However, in alternative embodiment a single display screen in, for example, goggles for eyewear 60 is useable with present invention wherein the single display screen is configured to operate in, for example, a split configuration to provide respective images to a patient's left and right eyes based upon display signals received from the video processor 60.

In addition, the exemplary embodiment 50 includes separate cameras 80 and 85 for illustration purposes only. A single camera disposed on, for example, a bridge area 68 may also be useable in accordance with the invention, especially with the use of a single display screen with the eyewear.

Exemplary Methods of Using Certain Embodiments of the Invention

The embodiments of the invention are useful for treating a neurocognitive impairment, disease or disorder, an example of which is spatial neglect. In one embodiment of the invention, the treatment used is PAT as described in "Prism Adaptation to a Rightward Optical Deviation Rehabilitates Left Hemispatial Neglect," *Nature*, 395(6698), 166-169 (1998), incorporated herein by reference. PAT is a visuomotor procedure involving target-oriented arm movement guided by prism-shifted vision. The treatment typically begins by determining a patient's pre-exposure baseline measurement of pointing performance. After the baseline is measured, eyewear comprising at least one lens having a prism mounted thereon is donned by the patient. The visual field occluder of the invention is placed onto the patient such that the visual field occluder is releasably worn by the patient, as shown in FIG. 2. In another embodiment of the invention, the eyewear worn by the patient has the visual field occluder already attached thereon (FIG. 5). The patient is then exposed to prismatic displacement to produce adaptation, followed by measurement of post-exposure after-effect of adaptation persistence. The preceding is presented in greater detail in Example 1 below.

EXAMPLES

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

Example 1

Prism Adaptation Treatment Using Embodiments of the Invention

In this Example, a patient underwent the Kessler Foundation Prism Adaptation Treatment (KF-PAT™) for left-sided spatial neglect (after right-brain damage) using the wearable system of the invention. The same principles and systems apply for treating right-sided spatial neglect.

I. Determination of Patient Eligibility

Patients with spatial neglect were defined by standardized assessment. To detect the presence and measure the severity of spatial neglect, the Kessler Foundation Neglect Assessment Process (KF-NAP™) was used. But the Catherine Bergego Scale, the Behavioral Inattention Test (BIT), the Bells test, the Apples test or other established tests detecting and measuring spatial neglect can also be used. Patients were not eligible if they had a history of vertigo (a result of a disturbance of the body's balancing mechanism, located in the inner ear).

Apparatus

The following tools were used to complete the KF-PAT™:

Prism Goggles: For patients with left-sided spatial neglect (after right-brain damage), prism lenses with the thicker part on the left could be used. For example, 20-diopter prism lenses shifted the entire visual field 11.3 degrees to the right. An opaque frame was used to block peripheral vision.

Position Board: Three white rectangles indicating the left, center, and right positions were used. Each white rectangle had a central marker at the edge facing the therapist.

Ruler Board: Zero was marked at the center of the board. Centimeters (cm) were marked to the left/right of the board. Positive was going right; negative is going left (relative to the patient).

Visual-proprioceptive task (VPT) Box: The board stood upright for patient to point under during the visual-proprioceptive pointing task.

Visual Field Occluder (VFO): To block the view of the initial arm movement from the patient during prism adaptation. The visual field occluder of FIG. 1 of the invention was used.

II. Basic Principles of KF-PAT™

During the visual-proprioceptive pointing task or during the prism adaptation, if the patient was unable to locate the target (the pen, line, or circle), up to five verbal cues were given. For example, "Look more to the left. Keep looking to the left. Turn your head more. Turn your neck more." The therapist provided the verbal cues from the midline of the patient (rather than talking to the patient from his/her left or tight side). If the patient was still unable to locate the target after five cues, the trial was skipped and moved on to the next.

The therapist's position was set right in front of the patient. This principle was directly related to the previous one. All auditory cues from the therapist came from the center. The following additional cues were acceptable:

a. During pre- and post-prism visual-proprioceptive pointing tasks, a pen was wiggled or a brightly-colored pen as the target was used.

b. During prism adaptation, the therapist used his/her finger to trace the line or the circle while giving verbal instructions, the patient was not asked to follow an object or the therapist's finger from the center to the side.

Patient's movement always started from the body center. The patient was initially reminded/cued for each movement. Additional cues were provided for remainder of treatment as needed.

Extra practice was given for a patient with severe neglect. When a patient with very severe neglect was encountered, the patient was given a practice session. The patient was asked to bisect lines and circles without the goggles of the invention. During the practice, the patient was asked to trace the line or touch the circle before the actual bisecting and marking. Optionally, his/her head or his/her arm was toward the left. This practice helped familiarize the patient with the task prior to the actual treatment session.

III. Performance of a Therapy Session Using Embodiments of the Invention

Tasks were administered in the following order: Proprioceptive pointing, visual-proprioceptive pointing, prism adaptation, proprioceptive pointing, visual-proprioceptive pointing and determination of nausea. Repeating the pointing tasks before and after prism adaptation was necessary to observe whether the patient adapted to prisms. That is, the mean of the post-prism pointing errors should be a smaller value or more negative than the mean of the pre-prism pointing errors, indicating a leftward shift of pointing behavior. This is called prism aftereffect. Research suggested that those who did not show prism aftereffect may receive little therapeutic benefit from the PAT.

1. Proprioceptive Pointing

Apparatus Used: Position board, ruler board, eye mask (or disposable mouth-nose mask), KF-PAT™ administration and data sheet and pen.

Set up: The patient was positioned at the center of a table, preferably adjusted to a comfortable height. An eye mask was placed on the patient. The therapist sat directly in front of the patient and aligned the center of the ruler board and the center of the position board to the midline of the patient. Thus, zero was at the patient's center. Positive numbers went towards the patient's right (therapist's left).

Verbal instructions were given:

First Trial: "I am going to blindfold you now. Without looking at your hand I would like you to make a fist and bring your hand to your chest. Then, point your index finger straight ahead of you until your arm is fully extended."

Subsequent Trials: "Good, Bring your hand to your chest, and point straight ahead."

Directions to Therapist:

The deviation from 0 was written down, noting "+" for right-sided deviation and "−" for left-sided deviation (related to the patient's perspective).

After each trial, the patient was reminded to return his/her hand to his/her chest as needed.

2. Visual-Proprioceptive Pointing

Apparatus: Position board, ruler board, VPT box, opaque apron or cloth, KF-PAT™ administration and data sheet and pen.

Set up: The patient was positioned at the center of the table. The position board was laid on the table. The VPT Box was set up, wherein the side with the central markers was facing towards the therapist. An apron or cloth was draped over the patient's shoulders and top of the tabletop board so he/she was unable to see his/her arms and hands. The center of the position hoard was aligned with the midline of the patient.

Verbal Instructions were given:

First Trial: "Now I am going to hold up my pen. What I would like you to do is start by making a fist and bringing your hand to your chest. Then, reach ahead to point at the pen. The pen is on/in the (left/right/center)"

Subsequent Trials: "Good. Bring your hand to your chest. Now point to the pen on/in the (left/right/center)"

3. Prism Adaptation

Apparatus: Prism goggles, position board, KF-PAT™ administration and data sheet, visual field occluder (VFO) of the present invention, marker and visuomotor exercise sheets.

Figure 4:
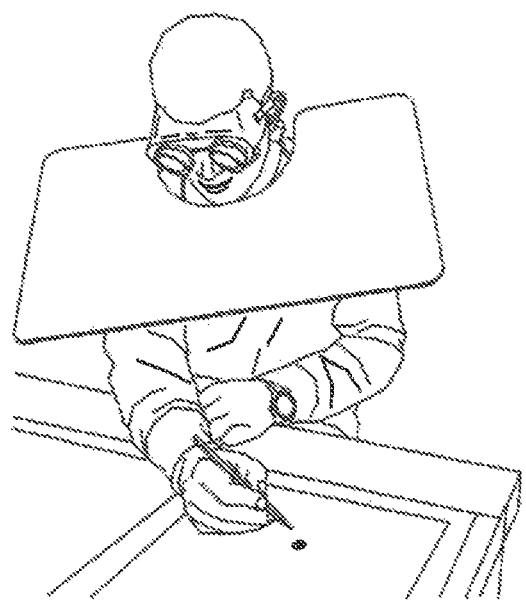
FIG. 4 is a perspective view of an exemplary wearable system embodiment of the present invention used by a patient in a prism adaptation therapy session.

Set up: As shown in FIG. 4, the position board was placed on the table and centered to the patient's body. The visual field occluder of the invention was placed on the patient. The prism goggles were placed on the patient. The therapist sat directly across from the patient. It was ensured that the patient was able to see all 3 white boxes on the position board. If not, the VFO or the height of table was adjusted as needed.

Verbal Instructions were given and results recorded:

First Trial: "Now that you are wearing the prism goggle, I would like you to take this marker, bring your hand to your chest, and then mark the center of the (line/circle) that is located to your (left/right/center)"

Subsequent Trials: "Good. Bring your hand back to your chest; now mark the center of the (line/circle) to your (left/right/center)."

4. Nausea Profile

The nausea profile was a seventeen-item questionnaire used to provide information whether the patient was experiencing negative side effects of the prisms. The therapist administered the nausea profile immediately after each of the first three sessions/days of PAT. If the patient showed no signs of nausea, the questionnaire was discontinued after the third day. If the patient did show signs of nausea, the therapist continued to administer the nausea profile for the rest of the sessions. If symptoms were severe, the therapist discontinued the treatment.

Example 2

Results of Prism Adaptation Therapy Session

Figure 6:
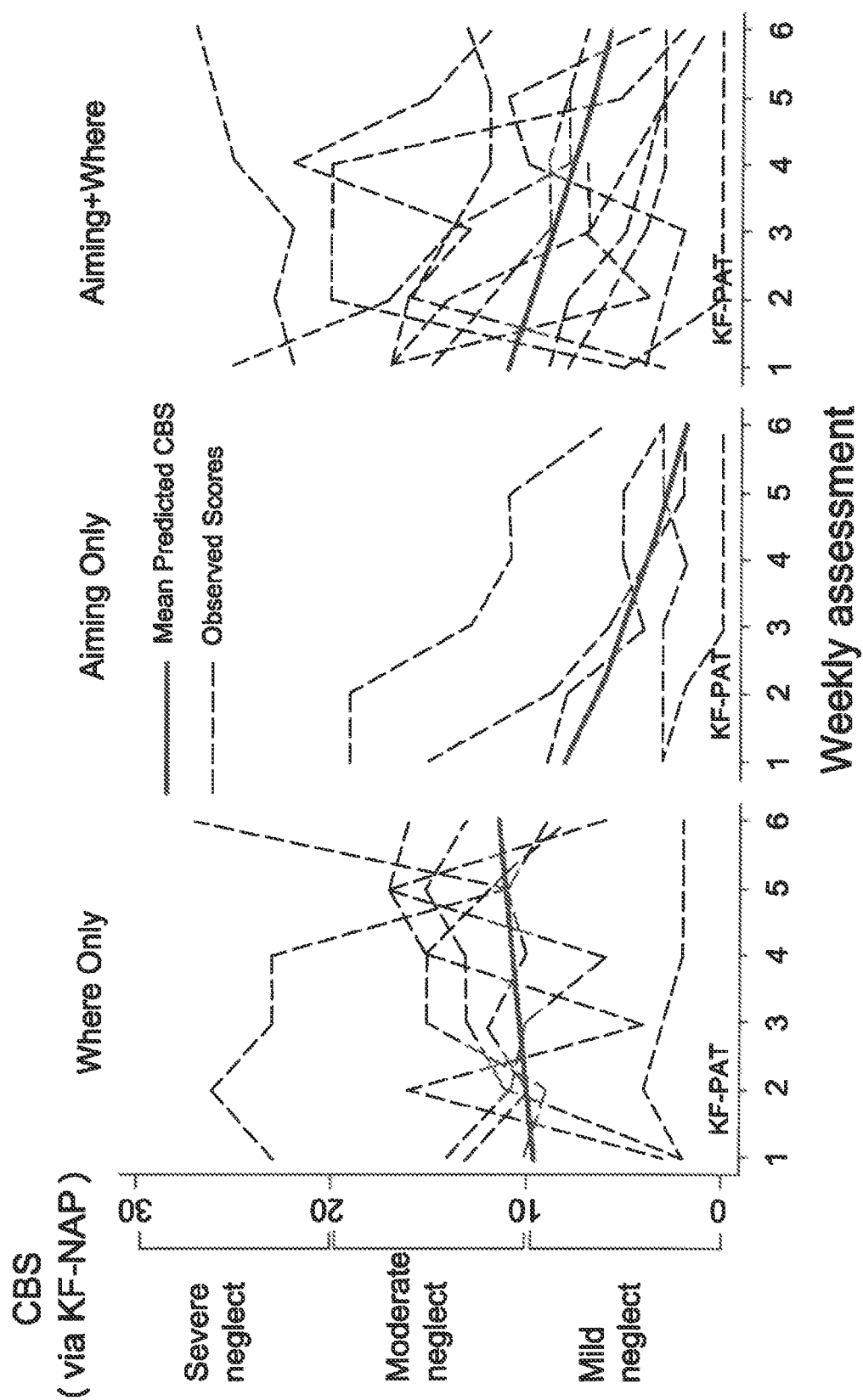
FIG. 6 is a set of graphs showing preliminary treatment outcomes using embodiments of the invention in prism adaptation treatment of patients with spatial neglect.

Following the therapy session from Example 1, and as shown in FIG. 6, patients with perceptual-attentional "where" bias only (n=7) showed no improvement after KF-PAT™, while those with motor-intentional "aiming" bias only (n=5) or both types of bias (n=12) demonstrated continuous functional recovery. The results suggested that KF-PAT™ using the visual field occluder of the invention may selectively improve function in neglect patients with motor-intentional "aiming" deficits. Goedert, K. M., Chen, P., Boston, R., Foundas, A. L., & Barrett, A. M. (2014). Presence of motor-intentional aiming deficit predicts functional improvement of spatial neglect with prism adaptation. *Neurorehabilitation and Neural Repair,* 28(5), 483-492.

The invention is further described by the following numbered paragraphs:

1. A wearable system for treatment of a neurocognitive impairment, disease or disorder in a patient in need thereof, comprising:
a visual field occluder releasably worn by the patient during the treatment comprising an opaque screen and attachment system, the attachment system configured to releasably attach the visual field occluder onto the patient.
2. The wearable system according to paragraph 1, further comprising eyewear worn by the patient with at least one lens having a prism mounted thereon.
3. The wearable system according to paragraph 1, wherein the neurocognitive impairment, disease or disorder comprises spatial neglect.
4. The wearable system according to paragraph 2, wherein the prism is rotatable.
5. The wearable system according to paragraph 1, wherein the opaque screen is comprised of a paperboard, fiberboard, foam board, plastic, metal, wood, fiberglass or textile material or combinations thereof.
6. The wearable system according to paragraph 1, wherein the visual field occluder further comprises adjusting mechanism to adjust the opaque screen vertically, horizontally or angularly relative to the visual field of the patient.
7. The wearable system according to paragraph 1, wherein the attachment system is comprised of one or more straps, wires or tubing or combinations thereof.
8. The wearable system according to paragraph 1, wherein the attachment system releasably attaches the visual field occluder around the torso of the patient,
9. The wearable system according to paragraph 1, wherein the attachment system releasably attaches the visual field occluder around the neck of the patient.

10. The wearable system according to paragraph 1, wherein the system is portable.
11. The wearable system according to paragraph 1, wherein the wearable system is used in conjunction with a table-top device housing targets used in a prism adaptation procedure.
12. A method of treating a neurocognitive impairment, disease or disorder in a patient in need thereof, comprising the steps of:
  placing eyewear onto the patient, the eyewear comprising at least one lens having a prism mounted thereon;
  placing a visual field occluder onto the patient such that the visual field occluder is releasably worn by the patient to substantially block visual feedback of arm movement of the patient during the treatment; and
  performing a prism adaptation procedure with the patient.
13. The method according to paragraph 12, wherein the neurocognitive impairment, disease or disorder comprises spatial neglect.
14. The method according to paragraph 12, further comprising an initial step of determining a pre-exposure baseline measurement of pointing performance prior to placing the eyewear onto the patient.
15. The method according to paragraph 12, wherein the prism adaptation procedure comprises the steps of:
  exposing the patient to prismatic displacement produce adaptation; and
  measuring postexposure after-effect of adaptation persistence.
16. Eyewear for treatment of a neurocognitive impairment in a patient in need thereof, comprising:
  a frame;
  at least one lens having a prism mounted thereon; and
  a visual field occluder attached to the frame comprising an opaque screen; the visual field occluder configured to substantially block visual feedback of arm movement of the patient when the eyewear is worn during the treatment.
17. The eyewear according to paragraph 16, wherein the prism is rotatable.
18. The eyewear according to paragraph 16, wherein the opaque screen is comprised of a paperboard, fiberboard, foam board, plastic, wood, fiberglass or textile material or combinations thereof.
19. The eyewear according to paragraph 16, wherein the visual field occluder further comprises an adjusting system, the adjustment system configured to enable adjustment of the opaque screen vertically, horizontally or angularly relative to the visual field of the patient.
20. The eyewear according to paragraph 16, wherein the opaque screen is retractable.
21. The eyewear according to paragraph 16, wherein the eyewear is a pair of eye glasses.
22. The eyewear according to paragraph 16, wherein the eyewear is a pair of goggles.
23. A wearable system for treatment of a neurocognitive impairment, disease or disorder in a patient in need thereof, comprising:
  eyewear having at least one display screen configured to be visible by at least one eye of a patient and otherwise blocking a portion of the patient's view beyond the eyewear for the at least one eye;
  at least one camera disposed on the eyewear configured to capture video images in front of the eyewear; and
  a video processor coupled to the at least one display screen and the at least one camera, the video processor configured to provide video images captured by the camera to the at least one display screen; the video images including a selectable prismatic effect and blocking of substantial portions of arm movement of the patient when worn by the patient.
24. The wearable system according to paragraph 23, wherein the at least one camera and at least one display screen includes at least one respective camera and display screen for each eye of the patient.
25. The wearable system according to paragraph 23, wherein the coupling of the video processor to the at least one display screen and the at least one camera includes at least one wireless coupling.
26. The wearable system according to paragraph 23, wherein the neurocognitive impairment, disease or disorder comprises spatial neglect.
27. The wearable system according to paragraph 26, wherein the selectable prismatic effect is to select the magnitude and the direction of a visual-field shift.
28. The wearable system according to paragraph 23, wherein the video processor enables adjustment of the blocking portion of the displayed video images vertically, horizontally or angularly.
29. The wearable system according to paragraph 24, wherein the video processor further comprises an output configured for providing video display signals to a second display.
30. The wearable system according to paragraph 23, wherein the eyewear is eye glasses.
31. The wearable system according to paragraph 23, wherein the eyewear is goggles.
32. A wearable system for treatment of a neurocognitive impairment, disease or disorder in a patient in need thereof, comprising:
  eyewear having at least one light transmissive panel configured to be visible by at least one eye of a patient, said panel having a first region without an obstructive view and a second region selectively blocking said patient's view;
  a prism mounted on said panel; and
  a processor coupled to the at least one panel, the processor configured to control the selective blocking of said second region to substantially block visual feedback of arm movement of the patient when the eyewear is worn during the treatment.

REFERENCES

Goedert, K. M., Chen, P., Boston, R., Foundas, A. L., & Barrett, A. M. (2014). Presence of motor-intentional aiming deficit predicts functional improvement of spatial neglect with prism adaptation, *Neurorehabilitation and Neural Repair*, 28(5), 483-492, doi: 10.1177/1545968313516872

Keane, S., Turner, C., Sherrington, C., & Beard, J. R. (2006). Use of Fresnel prism glasses to treat stroke patients with hemispatial neglect. *Archives of Physical Medicine and Rehabilitation*, 87(12), 1668-1672. doi: 10.1016/j.apmr.2006.08.322

Kerkhoff, G., & Schenk, T. (2012). Rehabilitation of neglect: An update, *Neuropsychologia*, 50(6), 1072-1079. doi: 10.1016/j.neuropsychologia.2012.01.024

Redding, G. M., & Wallace, B. (2011). Prism adaptation in left-handers. *Attention Perception & Psychophysics*, 73(6), 1871-1885. doi: 10.3758/s13414-011-0147-1

Rossetti, Y., Rode, G., Pisella, L., Farne, A., Li, L., Boisson, D., & Perenin, M. T. (1998). Prism adaptation to a rightward optical deviation rehabilitates left hemispatial neglect. *Nature*, 395(6698), 166-169, doi: 10.1038/25988

Wilms, I., & Mala, H. (2010). Indirect versus direct feedback in computer-based Prism Adaptation Therapy. *Neuropsychological Rehabilitation*, 20(6), 830-853. doi: 10.1080/09602011.2010.492711

Yang, N. Y. H., Zhou, D., Chung, R. C. K., Li-Tsang, C. W. P., & Fong, K. N. K. (2013), Rehabilitation interventions for unilateral neglect after stroke: A systematic review from 1997 through 2012. *Frontiers in Human Neuroscience*, 7(187). doi: 10.3389/fnhum.2013.00187

It is to be understood that the invention is not limited to the particular embodiments of the invention described above, as variations of the particular embodiments may be made and still fall within the scope of the appended claims.

The invention claimed is:

1. A wearable system for treatment of a neurocognitive impairment, disease or disorder in a patient in need thereof, comprising:
   a wearable visual field occluder comprising an opaque screen;
   an attachment system attachable to the wearable visual field occluder and configured to be releasably attachable to the patient with the opaque screen positioned-above shoulders of the patient, wherein when attached to the patient by the attachment system, the wearable visual field occluder is moveable with the patient and blocks visual feedback of an arm movement of the patient; and
   an eyewear having at least one lens comprising a prism, wherein the eyewear is configured to be worn by the patient separate and unsupported by the wearable visual field occlude,
   wherein the wearable system is adapted for performing a prism adaptation procedure by exposing the patient to prismatic displacement using the eyewear to produce an adaptation, and measuring a post-exposure after-effect of adaptation persistence relative to a pre-exposure baseline measurement of pointing performance determined prior to placing the eyewear onto the patient.

2. The wearable system according to claim 1, wherein the neurocognitive impairment, disease or disorder comprises spatial neglect.

3. The wearable system according to claim 1, wherein the prism is rotatable.

4. The wearable system according to claim 1, wherein the opaque screen is comprised of a paperboard, fiberboard, foam board, plastic, metal, wood, fiberglass or textile material or combinations thereof.

5. The wearable system according to claim 1, wherein the attachment system is adjustable to enable adjustment of the opaque screen vertically, horizontally or angularly relative to the visual field of the patient when the visual field occluder and attachment system is worn by the patient.

6. The wearable system according to claim 1, wherein the attachment system is comprised of one or more straps, wires or tubing or combinations thereof for releasably attaching to the patient.

7. The wearable system according to claim 1, wherein the attachment system releasably attaches the visual field occluder around the neck of the patient.

8. The wearable system according to claim 1, wherein the wearable system is portable.

9. A method of treating a neurocognitive impairment, disease or disorder in a patient in need thereof, comprising the steps of:
   attaching an attachment system to a visual field occluder, said visual field occluder comprising an opaque screen;
   releasably attaching the attachment system to the patient, wherein the releasably attaching of the attachment system to the patient positions the opaque screen above shoulders of the patient and wherein the wearable visual field occluder is moveable with the patient and blocks visual feedback of an arm movement of the patient during the treatment;
   placing an eyewear onto the patient that is separate and unsupported by the visual field occluder, the eyewear comprising at least one lens having a prism mounted thereon;
   determining a pre-exposure baseline measurement of pointing performance of the patient prior to placing the eyewear onto the patient; and
   performing a prism adaptation procedure with the patient comprising the steps of
      exposing the patient to prismatic displacement to produce adaptation, and
      measuring post-exposure after-effect of adaptation persistence.

10. The method according to claim 9, wherein the neurocognitive impairment, disease or disorder comprises spatial neglect.

* * * * *